United States Patent
Morselli

(10) Patent No.: US 11,338,380 B2
(45) Date of Patent: May 24, 2022

(54) ROTATING MACHINE TOOL AND PROCESS FOR CUTTING GEARWHEELS WITH ASYMMETRICAL TEETH

(71) Applicant: Danfoss Power Solutions S.R.L., Reggio Emilia (IT)

(72) Inventor: Mario Antonio Morselli, Modena (IT)

(73) Assignee: Danfoss Power Solutions S.R.L., Reggio Emilia (IT)

( * ) Notice: Subject to any disclaimer, the term of this patent is extended or adjusted under 35 U.S.C. 154(b) by 68 days.

(21) Appl. No.: 15/767,776

(22) PCT Filed: Oct. 11, 2016

(86) PCT No.: PCT/EP2016/074314
§ 371 (c)(1),
(2) Date: Apr. 12, 2018

(87) PCT Pub. No.: WO2017/064046
PCT Pub. Date: Apr. 20, 2017

(65) Prior Publication Data
US 2018/0281088 A1    Oct. 4, 2018

(30) Foreign Application Priority Data

Oct. 15, 2015    (IT) .................... 102015000062209

(51) Int. Cl.
*B23F 9/08*    (2006.01)
*B23F 15/08*    (2006.01)
(Continued)

(52) U.S. Cl.
CPC ............... *B23F 15/08* (2013.01); *B23F 5/22* (2013.01); *B23F 9/084* (2013.01); *B23F 21/16* (2013.01); *B23F 21/18* (2013.01)

(58) Field of Classification Search
CPC .. B23F 9/084; B23F 9/082; B23F 9/08; B23F 21/16; B23F 21/163; B23F 21/166;
(Continued)

(56) References Cited

U.S. PATENT DOCUMENTS 1,269,123 A * 6/1918 Simmons ................ B23F 21/16
407/23
1,343,276 A * 6/1920 Olson .................... B23F 21/005
407/26
(Continued)

FOREIGN PATENT DOCUMENTS

CH       279386 A  * 11/1951  .............. B23F 21/16
CN    202490983 U    10/2012
(Continued)

OTHER PUBLICATIONS

Description DE686364 (translation) obtained at https://worldwide.espacenet.com/ (last visited Sep. 23, 2019).*
(Continued)

*Primary Examiner* — Ryan Rufo
(74) *Attorney, Agent, or Firm* — McCormick, Paulding & Huber PLLC

(57) ABSTRACT

A rotating cutting tool to cut asymmetrical teeth in a gearwheel in which each tooth (21) has an active flank (A) with a convex profile meshing with the profile of a tooth of an opposing gearwheel meshing with the gearwheel and a secondary concave flank (S), provided with teeth (11) on a generally helical path which extends from one side to the other with respect to a median cross-section (M-M) of the tool which is intended to be intersected by the radius Rp of the gearwheel which is at right angles to the axis of rotation of the tool working on the gearwheel to cut its teeth. The helical teeth have a first flank (CA) which is intended to cut the said active flank (A) of the gearwheel teeth and a second flank (CS) intended to cut the secondary flank (S), the pitch (Continued)

(P1) between the first flank (CA) of the helical teeth being constant and the pitch (P2) of the second flank of the teeth being smaller than the pitch (P1).

4 Claims, 3 Drawing Sheets

(51) Int. Cl.
*B23F 5/22* (2006.01)
*B23F 21/16* (2006.01)
*B23F 21/18* (2006.01)

(58) Field of Classification Search
CPC ...... B23F 21/18; B23F 21/183; B23F 21/186; B23F 5/22; B23F 5/24; B23F 15/08
See application file for complete search history.

(56) References Cited

U.S. PATENT DOCUMENTS

| | | | | | |
|---|---|---|---|---|---|
| 1,436,159 | A | * | 11/1922 | Fitzpatrick | B23F 21/16 407/23 |
| 1,538,771 | A | * | 5/1925 | Wildhaber | B23F 21/18 407/23 |
| 1,693,687 | A | * | 12/1928 | Wildhaber | B23F 9/084 409/13 |
| 1,903,043 | A | * | 3/1933 | Head | B23F 9/084 409/13 |
| 2,050,233 | A | * | 8/1936 | Head | B23F 9/084 407/23 |
| 2,216,628 | A | * | 10/1940 | George | B23F 21/16 407/26 |
| 2,511,964 | A | * | 6/1950 | Boor | B23F 21/16 407/26 |
| 3,892,022 | A | * | 7/1975 | Johnson | B23F 21/16 407/26 |
| 5,205,679 | A | * | 4/1993 | Nagata | B23F 21/026 407/23 |
| 5,338,134 | A | * | 8/1994 | Peng | B23F 21/16 407/23 |
| 5,379,554 | A | * | 1/1995 | Thurman | B23F 21/005 451/177 |
| 2017/0355031 | A1 | * | 12/2017 | Metelsky | B24B 3/06 |
| 2019/0321901 | A1 | * | 10/2019 | Schaferling | B23F 5/02 |

FOREIGN PATENT DOCUMENTS

| | | | | |
|---|---|---|---|---|
| CN | 204565344 U | | 8/2015 | |
| CN | 104889501 A | | 9/2015 | |
| CN | 104919181 A | | 9/2015 | |
| DE | 686364 C | * | 1/1940 | ............. B23F 9/084 |
| DE | 846650 C | * | 9/1952 | ............. B23F 21/16 |
| DE | 896907 C | * | 12/1953 | ................ B23F 5/24 |
| DE | 102016104720 A1 | * | 9/2016 | ............. B23F 21/005 |
| EP | 0497309 A1 | * | 8/1992 | ............. B23F 21/18 |
| GB | 191118413 A | * | 9/1911 | ............. B23F 21/16 |
| GB | 230 884 A | | 3/1925 | |
| GB | 230884 A | * | 3/1925 | ............. B23F 9/082 |
| GB | 238935 A | * | 8/1925 | ............. B23F 9/082 |
| GB | 314708 A | * | 7/1929 | ............. B23F 21/18 |
| GB | 794912 A | * | 5/1958 | ............. B23F 21/166 |
| GB | 837554 A | * | 6/1960 | ............. B23F 21/16 |
| GB | 1099530 A | * | 1/1968 | ............. B23F 21/166 |
| GB | 1212871 A | * | 11/1970 | ............. B23F 21/16 |
| RU | 2087278 C1 | | 8/1997 | |
| WO | WO-2010058005 A1 | * | 5/2010 | ............. B23F 21/16 |
| WO | 2014/199202 A1 | | 12/2014 | |

OTHER PUBLICATIONS

DE686364 (human translation).*
Description WO2010058005A1 (translation) obtianed at https://worldwide.espacenet.com/ (last visited Aug. 26, 2021).*
International Search Report for Application No. PCT/EP2016/074314 dated Dec. 20, 2016.

* cited by examiner

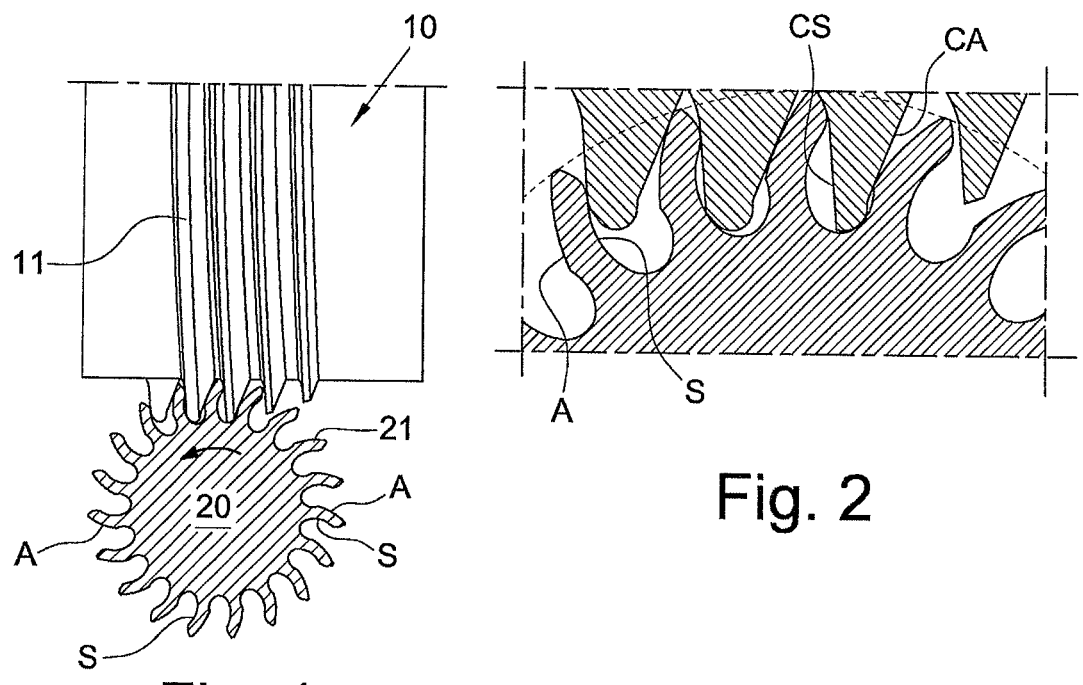
Fig. 1
Fig. 2
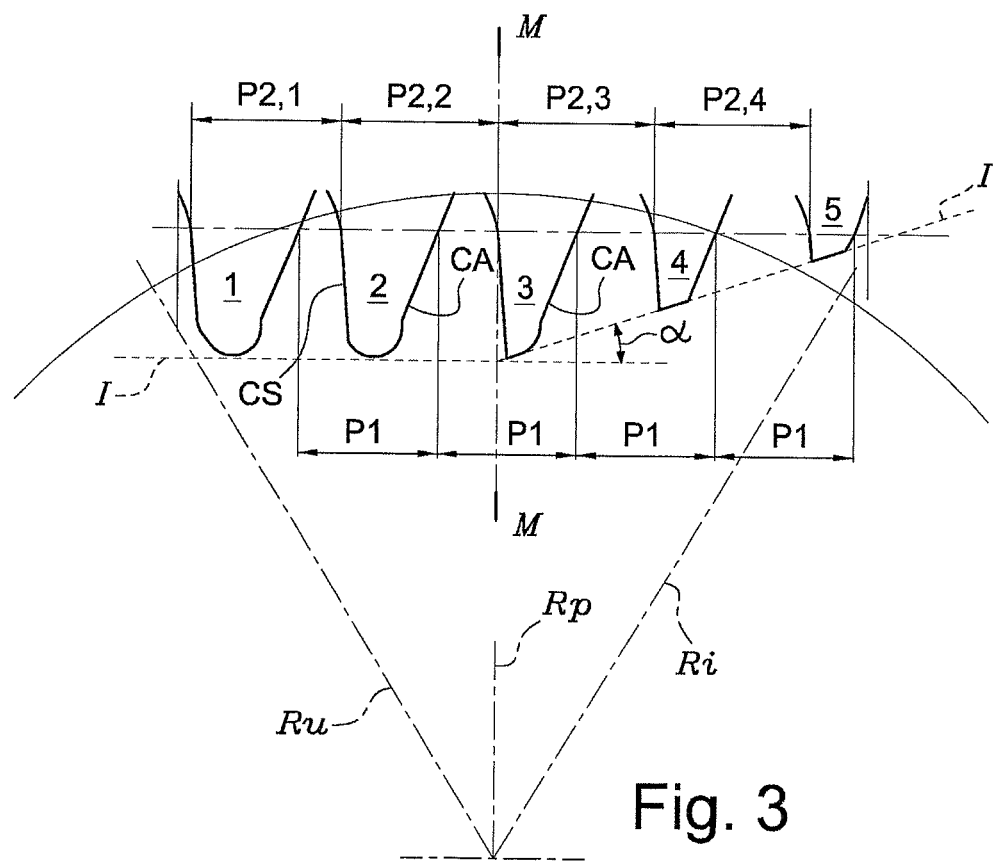
Fig. 3

KNOWN ART

KNOWN ART

ROTATING MACHINE TOOL AND PROCESS FOR CUTTING GEARWHEELS WITH ASYMMETRICAL TEETH

CROSS REFERENCE TO RELATED APPLICATION

This application is a National Stage application of International Patent Application No. PCT/EP2016/074314, filed on Oct. 11, 2016, which claims priority to Italian Patent Application number 102015000062209, filed 15 Oct. 2015, each of which is hereby incorporated by reference in its entirety.

TECHNICAL FIELD

This invention relates to the manufacture of gearwheels, and specifically to a rotating machine tool and process for cutting gearwheels with asymmetical teeth.

BACKGROUND

For specific applications it is advantageous to use gearwheels having strong asymmetric teeth, typically such an application may be for use in hydraulic gear pumps.

In this type of gearwheel each tooth has a convex (active) flank which is normally responsible for bearing against the tooth of a meshed gearwheel and a "secondary" flank for the synchronous rotation of gearwheels which are meshed together.

The active flank of a tooth of a gearwheel acts together with the active flank of an opposing gearwheel in a manner whereby conventional symmetrical teeth mesh through contact between conjugated surfaces.

When gearwheels are used in hydraulic pumps this direction of rotation corresponds to that direction required when pressurised liquids are pumped.

Therefore, the described meshing of the active flanks takes place for a particular direction of rotation of the gearwheels which is regarded as being "normal" in that it is the direction of rotation under the operating conditions of the device in which the gearwheel is used.

In a typical embodiment of these asymmetrical teeth have surprisingly demonstrated advantageous functional characteristics. Each tooth has a convex configuration corresponding to its active flank, and a concave configuration corresponding to its secondary flank.

Gearwheels of this type have for example been illustrated in Patent Application WO2014/199202A1.

Teeth of this type cannot be cut using conventional cutting machines known as hobbing machines. Such a machine is well known in the art and, for example, such a machine would use a process of cutting called the "Pfauter system", and associated technology.

On the other hand hobbing machines operating with this system are advantageous in terms of productivity and simplicity of manufacture, and in this respect are more satisfactory than other known alternative techniques.

However those skilled in the art see difficulties in using known rotating cutting tool techniques if pronounced asymmetry, in which a secondary flank of the tooth is concave, has to be cut into the tooth. In these cases a kind of undercut is produced in the space formed between consecutive teeth, especially if this characteristic is combined with a particularly high tool height (sometimes even more than 4 times the normal module), this combination results in that part of the tooth cut by one section of the cutting tool being sub-sequentially cut, and removed, by another section of the cutting tool during the complete cutting process.

SUMMARY

Surprisingly, it has been found that it is possible to obtain asymmetrical teeth, in which each tooth is cut by means of a hobbing machine using a rotating cutting tool, because the rotating cutting tool has an asymmetrical configuration providing: a first convex active flank which is substantially conjugated with the profiles of teeth having an identical configuration in a meshed gearwheel; and a secondary flank having a concave profile over at least part thereof.

Therefore, the object of the invention is to provide a solution to the cutting of teeth on a gearwheel as identified above, by means of a rotating tool through a high productivity cutting process whilst at the same time identify a rotating tool configuration which can be achieved using production techniques of a low complexity and cost, through the use of standard production machine tools.

In accordance with the invention the problem is solved through the use of a rotating cutting tool for generating asymmetrical teeth in a gear wheel wherein each tooth has an active side (A) with convex profile conjugated with the profile of a tooth of a counter gear wheel meshing with the gear wheel and a secondary concave side (S), wherein it is provided with a toothing having a generally helical development, which extends on one side and the other side with respect to a median section (M-M) of the tool intended to be intersected by the radius Rp of the wheel, said radius Rp being orthogonal to the rotation axis of the tool operating on the wheel to generate the teeth thereof, the helical toothing having a first side (CA) defining a cutting edge intended to generate said active side (A) of the wheel teeth and a second side (CS) defining a cutting edge intended to generate the secondary side (S), the pitch (P1) between the cutting edge of the first side (CA) of the helical toothing being constant and the pitch (P2) between the cutting edge of the second side of the toothing being greater than the pitch (P1) and variable along the axial direction of the tool.

The invention also relates to a process of cutting a gearwheel with teeth having asymmetrical profiles using a cutting tool.

BRIEF DESCRIPTION OF THE DRAWINGS

In order that the invention may be more readily understood, embodiments thereof will now be described, by way of example only, with reference to the accompanying drawings:

FIG. 1 shows a general diagrammatical view of a cutting tool associated with a gearwheel in which the teeth are being cut by the cutting tool;

FIG. 2 is a view in partial cross-section of the cutting tool associated with the teeth which it is cutting;

FIG. 3 is a diagrammatical illustration of the cutting tool in partial cross-section;

DETAILED DESCRIPTION

Figure 4A:
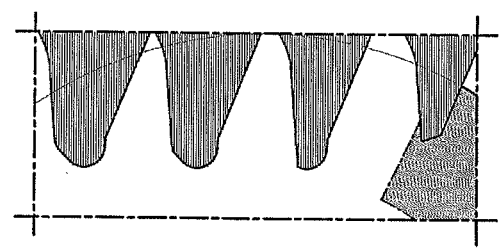
FIG. 4 shows six diagrammatical views similar to the view in FIG. 3 identified by a) to f) which illustrate in sequence how the tool operates when cutting a tooth in the gearwheel being cut.
Figure 4B:
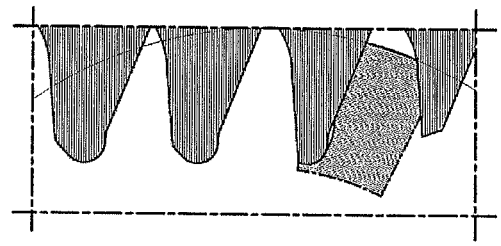
Figure 4C:
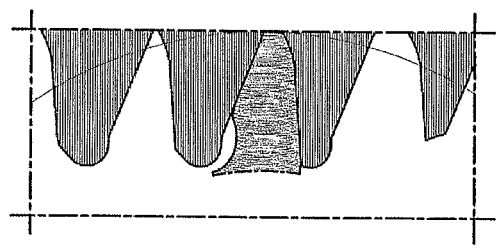
Figure 4D:
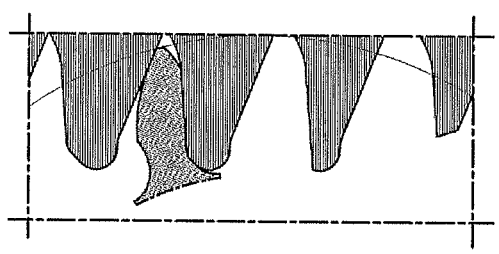
Figure 4E:
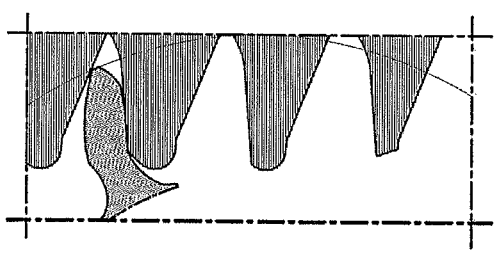
Figure 4F:
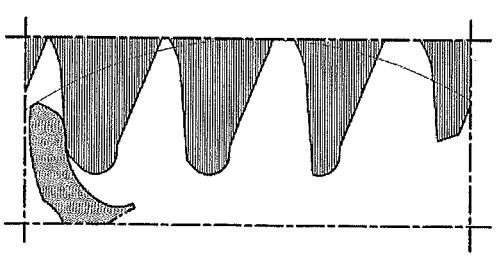

As illustrated in FIGS. 1 and 2, the asymmetrical teeth may be cut by a cutting tool according to the invention, indicated generically by 10, provided with cutting teeth which develop along helical convolutions in accordance with a conventional principle in the technology of cutting teeth in gearwheels by means of hobbing machines featuring rotating cutting tools. For clarity in the drawing the helical teeth indicated by 11 are shown as being continuous, while in practice these will be interrupted by gashes forming the cutting edges, effectively causing the removal of material from the gearwheel 20 during the cutting process in order to form meshing teeth. Thus, the helical convolutions of the cutting tool illustrated in the drawings must be more specifically understood to be the profile of all the cutting teeth of the tool.

Each tooth 21 in gearwheel 20 formed by cutting tool 10 has an active flank A which acts to transmit thrust normally against an identically configured tooth in an identical gearwheel, not shown, meshing with the gearwheel when the gearwheel is operating in the device in which it is used. For example, the machine working as a means for transferring pressurised fluid in a gear pump.

The other flank of tooth 21 is defined here as a secondary flank and indicated by S, and this has an overall concave shape except in the terminal portion close to its tip where, for a short distance, it has a convex shape to provide a connection between the concave flank and the active flank, defining a tip of the tooth which has a well-defined thickness.

The characteristics of a gearwheel considered here by way of example and according to the invention, are illustrated in greater detail in document WO2014/199202A1, the description of which must be considered to form part of this description.

This particular shape of tooth 21 makes it impossible to use a cutting tool having a conventional configuration which is intended to cut teeth having symmetrical or almost symmetrical flanks in conventional gears where both the flanks have an essentially convex profile and the teeth are of a height of the order of 2-3 times the normal module.

Figure 5:
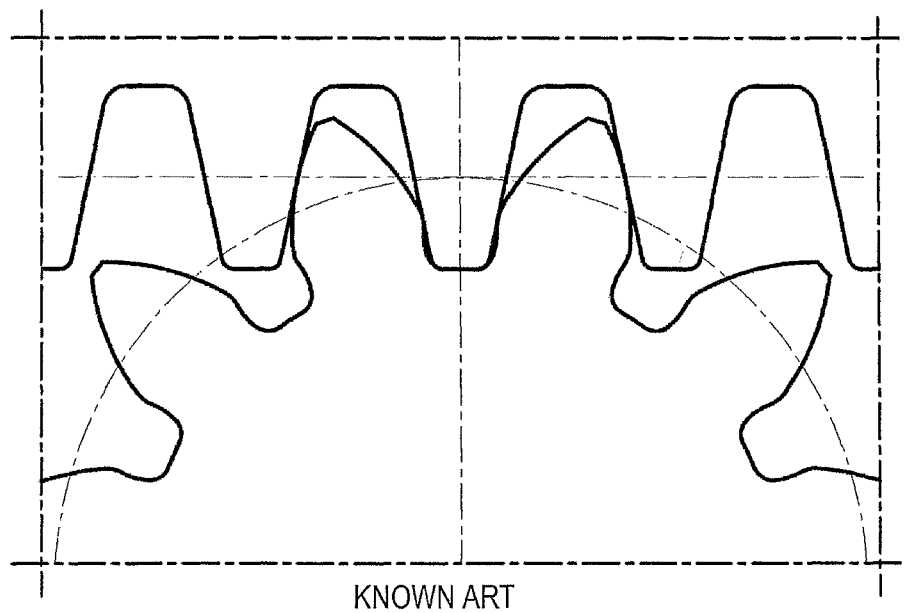
FIG. 5 illustrates the situation in which the tooth of a normal cutting tool made in accordance with the known technique for cutting symmetrical teeth can penetrate the space between two teeth of the gearwheel in contact with the sides of two consecutive teeth.

In these known cutting tools for generating symmetrical gear teeth, the tooth of the cutting tool may enter the space between two consecutive teeth of the gearwheel, being in contact with their flanks when such space between the two teeth is in a position defined by the radius of the gearwheel, which perpendicularly intersects the axis of the cutting tool; see for example FIG. 5.

Figure 6:
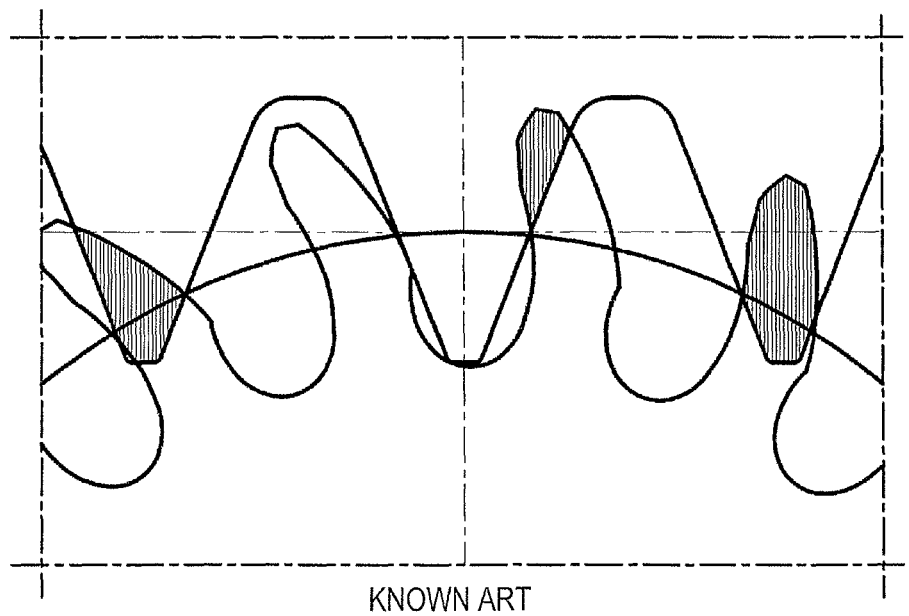
FIG. 6 illustrates in a diagrammatical view a situation similar to that in the figure showing how a cutting tool according to the known art which is suitable for generating symmetrical teeth interferes with the teeth of a gearwheel having asymmetrical teeth which the invention is intended to produce, removing material.

On the other hand, in the gearwheel having asymmetrical teeth which has to be manufactured in accordance with the invention, the secondary flank of the tooth is concave and consequently the space between consecutive teeth forms an undercut with respect to a radius of the gearwheel, in such a way that the tooth of a rotating cutting tool having a conventional configuration cannot be extracted radially from that space because its extraction will bring about removal of useful material of the tooth; this effect is illustrated diagrammatically in FIG. 6.

In addition to this, the teeth of conventional cutting tools having cutting teeth of constant configuration would remove material from the active flank of the gearwheel tooth if it were to constantly have the height required for cutting the secondary flank.

The problem of cutting the periphery of a gearwheel having asymmetrical teeth with a concave secondary flank can be achieved, contrary to an apparent impossibility according to the normal knowledge of those skilled in the art, by creating a cutting tool configured as shown in the figures.

Cutting tool 10 operates on the gearwheel to cut the teeth in a zone of the gearwheel defined between the arcs extending through the two sides of the radius of the gearwheel which is perpendicular to the longitudinal axis of the cutting tool, conventionally indicated here as Rp. In this description the transverse cross-section of the cutting tool on which radius Rp lies will be indicated as the "median cross-section" M-M of the cutting tool, it being understood that this cross-section is located in an intermediate position between the ends of the helical teeth, but not necessarily at an equal distance from such ends.

The cutting tool therefore operates along an entry arc lying between radiuses Ri and an exit arc Ru, indicated in FIG. 3.

In this description the area in which material begins to be removed from the gearwheel by the cutting tool will conventionally be referred to as the "entry" and the zone in which the fully cut tooth relinquishes contact with the cutting tool will be conventionally defined as the "exit" when the cutting tool and the gearwheel being cut have directions of rotation as indicated in the figure.

The cutting tool is characterised by a tapering course in at least one zone of its path acting in the arc of the gearwheel preceding the intersection with Rp, lying between Ri and Rp. The cutting tool has instead a substantially cylindrical path which acts on the arc of the gearwheel following the intersection with Rp, lying between Rp and Ru.

The radial dimension of the cutting tool is understood to be the dimension corresponding to the surface enveloping the ends of the teeth of the cutting tool itself, indicated in the drawing by dashed line I-I.

The tapering portion of the cutting tool does not necessarily have to fully and exclusively occupy the zone of the helical teeth from its median cross-section M-M to its end, and the point in line I/I where the two converging segments converge with an angle α may not coincide exactly with the intersection of dashed line I-I and radius Rp.

The teeth of the cutting tool have a flank CA which is intended to remove material from gearwheel 20 to generate the active flank of tooth 21 and a CS flank intended to remove material to form the secondary flank S of the teeth 21 of the gearwheel.

The flanks CA and CS of the teeth have different configurations.

FIG. 3 shows five consecutive cross-sections of the teeth of cutting tool 10 located on the corresponding radial section of the cutting tool, numbered from 1 to 5, it being understood that the teeth of the cutting tool develop along helical convolutions, interrupted by axial gashes, which form the cutting edges, as is known in cutting tools of this type. It is also pointed out that the number of teeth identified by the radial cross-sections of the cutting tool illustrated in FIG. 3 should not be regarded as being a parameter which should be considered to be fixed for the cutting tool according to the invention and described here by way of example—the number of teeth in any cross-section may be less than or greater than those shown in the cross section of FIG. 3, depending upon the type and dimensions of the gearing which has to be produced, and also depending upon the basis of considerations associated with optimisation of the tooth cutting process.

As will be seen in the figures, the shape of flank CA of the teeth 11 of cutting tool 10 remains constant in the various cross-sections 1-5 of the teeth, although it takes into account the variable height of the tooth. In fact flank CA is intended to remove material to generate the active flank A of the gearwheel's teeth, which also have the typical conjugated profile of teeth with a symmetrical shape and are intended to bear against the corresponding flank of an identical gearwheel in accordance with the kinematic function specific to the conjugated profiles of the gear teeth.

As indicated by P1 in FIG. 3, the pitch between flanks CA in the teeth of the cutting tool is constant. In addition to this, pitch P2 between flanks CS of the various cross-sections 1-5 of the teeth is not instead constant along all the helical convolutions of the cutting tool. Moreover, the pitch P2 between the CS flanks in the thread of teeth 11 must be greater than the pitch P1 between the CA flanks. This difference in the magnitude of pitches P1 and P2 obviously determines a progressive increase in the thickness of the cutting teeth, from the "entry" to the "exit" region, as previously defined.

With reference to the various cross-sections 1-5, this pitch is indicated as P2.1, P2.2 . . . so on and so forth in FIG. 3. Pitch P2.1 must be smaller than P2.2 and pitches P2.3, P2.4 should not be greater than P2.2.

The height of teeth 11 in the helical convolutions of the cutting tool corresponding to cross-sections 3, 4 and 5 (which operate in the arc of the gearwheel between radiuses Ri and Rp) must be lower than the height of the teeth 11 in the final convolution, corresponding to the cross-section 1 (which operate in the arc of the gearwheel between radiuses Ru and Rp).

In addition to this, the height of the cutting teeth corresponding to the cross-sections 1 and 2, which act along the arc of the gearwheel which has passed the position identified by radius Rp, is substantially constant, whereas the height of the cutting teeth in the cross-sections indicated by 3, 4 and 5 is markedly variable.

The angle $\alpha$ between the segment of line I-I which is tangential to the tips of the cutting tool teeth in its tapering path (affecting the cross-sections of the teeth indicated by 3, 4 and 5 in FIG. 3) is selected in such a way that the teeth of the cutting tool in the entry (cross-sections 4 and 5 in particular) do not result in a configuration which includes an excessively thin tip zone.

This lesser height of the teeth in the zone conventionally defined as the entry and the subsequent teeth of the cutting tool, which determines the tapering configuration on a longitudinal portion of the cutting tool, is due to the fact that the angular pitch of the gearwheel is smaller than the angular pitch that would characterize a gearwheel having symmetrical teeth with a meshing profile A, as illustrated in mentioned application WO2014/199202A1 in the name of the applicant. The smaller angular pitch of the gearwheel 20 reduces the size of the space between consecutive teeth, and this effect is heightened by the concave configuration of the secondary profile S, which implies to reduce the height of the cross-section of teeth 11, where these begin to remove material from the gearwheel 20, in view of the assumed direction of rotation of the cutting tool and the gearwheel in the description of the embodiment here presented.

However, a person skilled in the art will understand that the gear cutting may take place as illustrated above or alternatively by reversing the directions of rotation of the cutting tool and the gearwheel. Correspondingly, the zones defined as the "entry" and "exit" of the arc in which the cutting tool operates to generate the teeth in the gearwheel will be inverted. In both cases the tapering configuration of the helical convolutions of the cutting tool, acting on the gearwheel in the zone between radiuses Rp and Ri will prevent the teeth of the gearwheel from being destroyed during the gear cutting process.

Quite obviously, the correct generation can only occur when the median cross-section of the teeth of the cutting tool are in a well-defined position with respect to radius Rp of the gearwheel.

From what has been illustrated above it follows that the cutting tool according to the invention is provided with teeth developing through helical convolutions, with asymmetrical flanks and a shape that varies along the axis, in which:

the teeth have a maximum cross-section at the peripheral region of the cut, defined as "exit" in this embodiment, contrary to what is the case in the known art, according to which a full cross-section of the teeth of the cutting tool with at least one complete tooth in the central position is in line with the centre of the gearwheel, that is corresponding to radius Rp;

there are cross-sections of the teeth, at least in a limited number of convolutions, having a progressively increasing thickness, the characteristic being achieved by increasing the pitch P2 of secondary flank CS in comparison with primary pitch P1 (P2>P1);

the helical teeth 11 of the cutting tool have a substantially cylindrical envelope over their longitudinal portion and a tapering envelope over their other longitudinal portion.

The geometry of the teeth of the cutting tool according to the invention and its profound difference from the geometry of the teeth of conventional tools for cutting gear teeth can be further identified by considering their base pitch.

As it is known, the base pitch is the distance between corresponding profiles of consecutive teeth measured along the path of action.

In conventional symmetrical teeth the base pitch Pb has a value $Pb = P \cos \beta$, where $\beta$ indicates the angle of inclination of the line of action with respect to the tangent to the original circumference. Thus the base pitch Pb is generally smaller than the transverse pitch P.

In the teeth of the tool according to the invention, as illustrated in FIG. 3, the base pitch Pb between the CS flanks which are intended to cut the secondary flanks of the gearwheel is not smaller than the transverse pitch of the opposite flank CA.

In particular, the transverse pitch P1 between the CA flanks of teeth is substantially smaller than the base pitch Pb2.1, Pb2.2 . . . between the flanks CS. From experiments performed by the applicant it has proved to be advantageous that the ratio between the base pitch and the transverse pitch is conveniently selected to be greater than 1, in particular between 1.02 and 1.05.

In general, the base pitch between the CS flanks of the teeth of the tool is preferably greater than that of all the teeth, always measured in relation to the reference line of the teeth of the cutting tool, which can be regarded as passing close to the central position with respect to the height of the tooth.

The manner in which the cutting tool illustrated in FIGS. 1 and 3 operates is better illustrated in FIG. 4 which shows six successive stages in the process of cutting which can be performed using the rotating cutting tool described above. These stages are identified as b, c, d and f, always considering the direction of rotation of the gearwheel and the cutting tool as described above by way of a non-limiting example.

It is clearly apparent from the figure how the active or main flank A of the teeth of the gearwheel 20 are effectively generated by the flank CA of the cutting teeth, while a good part of the secondary profile S is obtained by taking advantage of various cutting interferences which progressively remove material, a phenomenon which is normally avoided in the design of cutting tools. It follows from this that the secondary flank of the cutting tool cannot be defined as conjugated with the secondary profile S of the gearwheel in the strict sense of the word.

It will thus be noted more clearly how the progressive increase in the thickness of the teeth of the cutting tool progressively reduces the pitch between the CS flanks, bearing in mind that the pitch between the CA flanks remains constant. This increase in the thickness of the tooth makes it possible for the teeth of the cutting tool to remove material from the tooth of the gearwheel on the side which has to adopt the configuration of concave flank S when tooth 21 of the gearwheel passes the position in line with radius Rp and the tooth of the gearwheel begins to move away from the space between the teeth of the cutting tool.

It will be noted from FIG. 4a-f that with the proposed cutting tool configuration and the specific configuration of the teeth with respect to radius Rp the zone of contact and cutting between the CS flank of the teeth of the cutting tool and the S flank of the teeth of the gearwheel have an orientation which is quite close to being parallel to Rp. This makes it possible to withdraw the teeth from the gearwheel without interference, despite the concave configuration of flank S, thus achieving the intended object.

It should be understood that the axial position of the cutting tool is kept fixed and defined with respect to the axis of the gearwheel being cut, in view of the fact that the shape of the teeth of the cutting tool varies continuously along the helical path.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A rotary cutting tool for generating asymmetrical teeth in a gear wheel, each tooth of the gear wheel having an active side (A) with a convex profile conjugated with the profile of a tooth of a counter gear wheel meshing with the gear wheel and a secondary concave side (S), the rotary cutting tool comprising:
    a cylindrical body extending along an axial direction of the tool;
    a helical toothing extending outward from the cylindrical body along the axial direction of the tool;
    wherein the helical toothing extends on a first side of a median section of the tool and a second side of the median section (M-M) of the tool, the median section (M-M) being defined as a cross-section perpendicular to the axial direction of the tool and configured to be intersected by a radius Rp of the gear wheel, said radius Rp being orthogonal to the rotation axis of the tool operating on the gear wheel to generate the teeth thereof;
    wherein each tooth of the helical toothing has a first side (CA) defining a first side cutting edge configured to generate said active side (A) of said gear wheel teeth, a second side (CS) defining a second side cutting edge configured to generate the secondary concave side (S), and a maximum height measured from a tip of the tooth to a base of the tooth at the cylindrical body;
    wherein a first pitch (P1) between the first side cutting edge of consecutive teeth of the helical toothing is constant;
    wherein a second pitch (P2) between the second side cutting edge of the consecutive teeth of the helical toothing is greater than the first pitch (P1) and variable along the axial direction of the tool;
    wherein, nearest to the median section (M-M) on the first side of the median section (M-M), the second pitch (P2) is greatest on the first side of the median section (M-M);
    wherein, on the second side of the median section (M-M), the second pitch (P2) is not greater than the second pitch (P2) nearest to the median section (M-M) on the first side of the median section (M-M);
    wherein, on the first side of the median section (M-M) of the tool, the second pitch (P2) decreases, and as the second pitch (P2) decreases a thickness of the helical toothing increases, respectively, the thickness of the helical toothing measured in a direction parallel to the axial direction;
    wherein, on the first side of the median section (M-M) of the tool, the maximum height between the consecutive teeth of the helical toothing in the axial direction is substantially constant over a first portion of said helical toothing between a first end of the helical toothing and the median section (M-M); and
    wherein, on the second side of the median section (M-M) of the tool, the maximum height between the consecutive teeth of the helical toothing in the axial direction decreases over a second portion of said helical toothing between the median section (M-M) and a second end of the helical toothing, the second end being opposite the first end.

2. The rotary cutting tool according to claim 1, wherein in the second portion in which the maximum height between the consecutive teeth of the helical toothing decreases between said median section and the second end of the toothing, the maximum height between the consecutive teeth of helical toothing begins to decrease at a point closer to the median section than the second end of the helical toothing.

3. The rotary cutting tool according to claim 1, wherein, in a direction from an entry toward an exit, the thickness of the helical toothing increases progressively from the entry to the exit; and
    wherein said entry refers to an area in which material begins to be removed from the gear wheel by the tool, and said exit refers to an area in which a fully cut tooth of the gear wheel relinquishes contact with the tool.

4. A process for generating asymmetrical teeth, comprising
    providing the rotary cutting tool according to claim 1,
    rotating the rotary cutting tool,
    engaging the gear wheel with the rotary cutting tool
    the tool being held in an axially fixed position with the median section (M-M) thereof aligned with the radius Rp of the gear wheel, said radius Rp being orthogonal to the rotation axis of the rotary cuttung tool.

* * * * *